(12) United States Patent
Tang et al.

(10) Patent No.: US 12,691,431 B2
(45) Date of Patent: Jul. 28, 2026

(54) REACTION KETTLE AND COATING PREPARATION METHOD USING REACTION KETTLE

(71) Applicant: HAIAN INSTITUTE OF HIGH-TECH RESEARCH, NANJING UNIVERSITY, Haian City (CN)

(72) Inventors: Shaochun Tang, Haian City (CN); Hongbin Lu, Haian City (CN); Xiangkang Meng, Haian City (CA)

(73) Assignee: HAIAN INSTITUTE OF HIGH-TECH RESEARCH, NANJING UNIVERSITY, Haian City (CN)

( * ) Notice: Subject to any disclaimer, the term of this patent is extended or adjusted under 35 U.S.C. 154(b) by 656 days.

(21) Appl. No.: 18/254,760

(22) PCT Filed: Feb. 14, 2023

(86) PCT No.: PCT/CN2023/075834

§ 371 (c)(1),
(2) Date: May 26, 2023

(87) PCT Pub. No.: WO2023/246125

PCT Pub. Date: Dec. 28, 2023

(65) Prior Publication Data

US 2025/0073663 A1 Mar. 6, 2025

(30) Foreign Application Priority Data

Jun. 23, 2022 (CN) .......................... 202210715865.0

(51) Int. Cl.
| | |
|---|---|
| *B01J 19/18* | (2006.01) |
| *B01J 4/00* | (2006.01) |
| *B01J 19/00* | (2006.01) |

(52) U.S. Cl.
CPC .............. *B01J 19/18* (2013.01); *B01J 4/001* (2013.01); *B01J 4/004* (2013.01); *B01J 4/007* (2013.01);
(Continued)

(58) Field of Classification Search
CPC ........ B01J 19/18; B01J 19/0053; B01J 4/001; B01J 4/004; B01J 4/007; B01J 4/008; B01J 2219/00164; B01J 2204/002
See application file for complete search history.

(56) References Cited

U.S. PATENT DOCUMENTS

| | | |
|---|---|---|
| 5,462,719 A | 10/1995 | Pedersen et al. |
| 2007/0289879 A1 | 12/2007 | Horton |

FOREIGN PATENT DOCUMENTS

| | | |
|---|---|---|
| CN | 203935831 U | 11/2014 |
| CN | 105903424 A | 8/2016 |

(Continued)

*Primary Examiner* — Lessanework Seifu
(74) *Attorney, Agent, or Firm* — Todd R. Fronek; Larkin Hoffman Daly & Lindgren, Ltd.

(57) ABSTRACT

Disclosed are a reaction kettle and a coating preparation method using the reaction kettle. The reaction kettle includes a kettle body (100), the top of the kettle body (100) is provided with a feed port (110), and the side of the kettle body (100) is provided with a discharge port (120). An upper partition plate (200) is rotatably arranged in a chamber of the kettle body (100), an upper jet center (201) and a number of upper flow ports (202) arranged around the upper jet center (201) are respectively provided on the upper partition plate (200). A lower partition plate (300) is attached to the upper partition plate (200), a lower jet center (301), a number of lower flow ports (302) and a number of through-flow ports (303) arranged around the lower jet center (301) are respectively provided on the lower partition plate (300).

20 Claims, 6 Drawing Sheets

(52) U.S. Cl.
CPC ...... *B01J 19/0053* (2013.01); *B01J 2204/002* (2013.01); *B01J 2219/00164* (2013.01)

(56) References Cited

FOREIGN PATENT DOCUMENTS

| CN | 107469736 A | 12/2017 |
|----|-------------|---------|
| CN | 212119990 U | 12/2020 |
| CN | 112892442 A | 6/2021 |
| CN | 214076221 U | 8/2021 |
| CN | 114797649 A | 7/2022 |
| WO | WO 2021/143905 | 7/2021 |

REACTION KETTLE AND COATING PREPARATION METHOD USING REACTION KETTLE

CROSS-REFERENCE TO RELATED APPLICATION

This patent application is a national stage application of International Patent Application No. PCT/CN2023/075834, filed on Feb. 14, 2023, which claims the benefit and priority of Chinese Patent Application No. 202210715865.0, filed with the China National Intellectual Property Administration on Jun. 23, 2022, the disclosure of which is incorporated by reference herein in its entirety as part of the present application.

TECHNICAL FIELD

The present disclosure relates to the technical field of metal material plating, in particular to a reaction kettle and a coating preparation method using the reaction kettle.

BACKGROUND

With the development of technologies, novel conductive polymer materials are increasingly used as substitutes for precious metals that pollute the environment and are applied to the corrosion protection of devices. Among them, polyaniline (PANI) is the most widely studied polymer material. Its redox state may form a passive film on the substrate to promote the anodic protection of steel. Meanwhile, PANI has good corrosion resistance. At present, the commonly used preparation method is electrodeposition on the metal surface.

However, the existing solution preparation has a certain difficulty, for example, the solution mixing in the reaction kettle is in the form of extensive and large-flow mixing, which leads to uneven mixing of the whole solution.

SUMMARY

The technical problem to be solved by the present disclosure is that a reaction kettle is provided to solve one of the technical problems in the prior art.

The technical solutions adopted by the present disclosure for solving the technical problem is as follows: a reaction kettle includes:

a kettle body, the top of which is provided with a feed port, and the side of which is provided with a discharge port;

an upper partition plate, which is rotatably arranged in a chamber of the kettle body, where an upper jet center and a number of upper flow ports arranged around the upper jet center are respectively provided on the upper partition plate, and the lengths of flow paths from the upper jet center to the upper flow ports are equal;

a lower partition plate, which is attached to the upper partition plate, where a lower jet center, and a number of lower flow ports and a number of through-flow ports arranged around the lower jet center are respectively provided on the lower partition plate, the lengths of flow paths from the lower jet center to the lower flow ports are equal, and each upper flow port communicates with one of the through-flow ports; and an adjusting portion, which is threaded to the upper jet center, where liquid can flow from the adjusting portion to the upper jet center and the lower jet center, respectively, and the adjusting portion extends out of the feed port.

When the adjusting portion is rotated to a first station, the liquid on the upper partition plate flows into the kettle body ahead of the liquid on the lower partition plate.

When the adjusting portion is rotated to a second station, the liquid on the upper partition plate and the liquid on the lower partition plate flow into the kettle body at the same time.

When the adjusting portion is rotated to a third station, the liquid on the lower partition plate flows into the kettle body ahead of the liquid on the upper partition plate.

Preferably, multiple lower flow ports are circumferentially surrounded by multiple through-flow ports; and The multiple through-flow ports are arranged horizontally and longitudinally.

Preferably, the adjusting portion includes a blind hole pipe with a blind hole formed inside, and a lower tee pipeline and an upper tee pipeline are arranged upwards from the bottom of the blind hole pipe. The center of the lower tee pipeline is downwards provided with a flow pipe orifice, the center of the upper tee pipeline is upwardly connected to the blind hole pipe, and an outer ring surrounding the blind hole pipe is provided with a casing wall.

A casing opening is provided surrounding the casing wall.

The middle part of the upper jet center is provided with a threaded through groove, the inner wall of the threaded through groove is provided with a U-shaped groove having a U-shaped cross section, and the blind hole pipe is threaded into the threaded through groove.

The casing wall is rotated to adapt to the first station, the second station and the third station.

Preferably, a gap between the upper tee pipeline and the lower tee pipeline is in fit with a slot of the U-shaped groove.

Preferably, the end face, close to the threaded through groove, of the upper partition plate is provided with a first label, a second label and a third label, and the side wall of the blind hole pipe is provided a first corresponding label, a second corresponding label and a third corresponding label.

When the first label and the first corresponding label are adapted to each other, the blind hole pipe is located at the first station.

When the second label and the second corresponding label are adapted to each other, the blind hole pipe is located at the second station.

When the third label and the third corresponding label are adapted to each other, the blind hole pipe is located at the third station.

The present disclosure has the beneficial effects that the reaction kettle of the present disclosure can achieve layered and batchwise transport of the liquid, and can prevent volatilization of volatile substances well by means of the lower partition plate while promoting the mixing of two types of liquid, and has good mixing effect.

It is also provided by a coating preparation method using the above reaction kettle according to the present disclosure. The method includes the following steps:

S1: adjusting an adjusting portion to a third station, injecting hydrochloric acid into a kettle body from the adjusting portion;

S2: adjusting the adjusting portion to a second station, injecting polyacrylic acid and ammonium sulfate from an upper partition plate and a lower partition plate, respectively, and mixing the polyacrylic acid and ammonium sulfate;

S3: adjusting the adjusting portion to a first station, injecting solution containing Zn/C composite spherical particles and aniline monomers from the upper partition plate and the lower partition plate, respectively, and mixing the solution containing Zn/C composite spherical particles and aniline monomers to form mixed solution;

S4: dripping and coating the mixed solution on the surface of a workpiece and performing spin coating to form a spin-coating solution surface;

S5: heating the workpiece, and evaporating the spin-coating solution surface to form a spin-coating layer; and S6: coating a polyethyleneimine solution on the surface of the spin-coating layer, heating the workpiece, and evaporating the spin-coating layer to form a protective coating.

Preferably, the method further includes the following steps:

S7: repeating step S4 to step S6 for twenty times.

Preferably, the rotating speed for spin coating is from 1,300 rpm to 3,000 rpm, and the thickness of a single protective coating is from 2 μm to 3 μm.

The present disclosure has the beneficial effects that the coating preparation method using the reaction kettle is simple and fast in preparation process and good in preparation effect.

BRIEF DESCRIPTION OF THE DRAWINGS

The present disclosure is further described below with reference to the accompanying drawings and embodiments.

Figure 1:
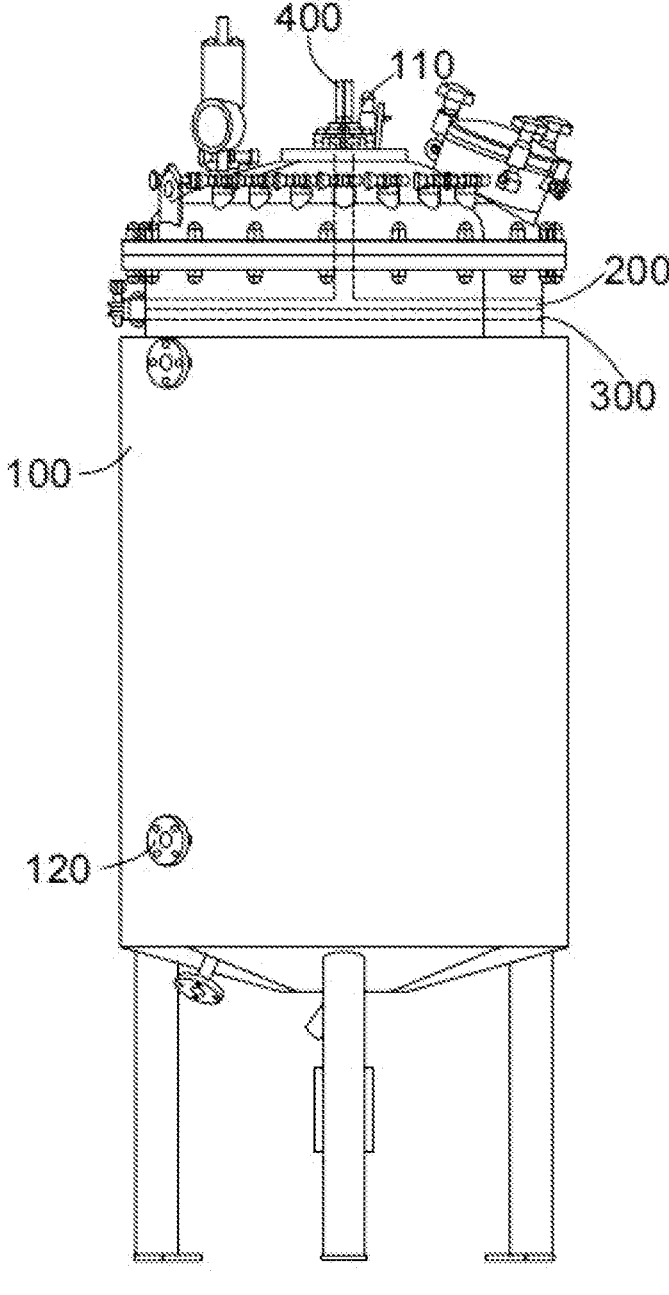
FIG. 1 is a front view of a preferred embodiment of a reaction kettle in accordance with the present disclosure.

In the drawings: 100—kettle body; 110—feed port; 120—discharge port;

200—upper partition plate; 201—upper jet flow; 202—upper flow port; 203—threaded through groove; 204—U-shaped groove; 205—main flow channel; 206—trunk flow channel; 207—secondary flow channel; 208—branch flow channel;

300—lower partition plate; 301—lower jet center; 302—lower flow port; 303—through-flow port; 304—main gushing channel; 305—trunk gushing channel; 306—branch gushing channel;

400—adjusting portion; 401—blind hole pipe; 402—lower tee pipeline; 403—upper tee pipeline; 404—casing wall; 405—casing opening.

DETAILED DESCRIPTION OF THE EMBODIMENTS

The present disclosure is further described in detail with reference to the accompanying drawings. These drawings are simplified schematic diagrams and are merely used to illustrate the basic structure of this invention. Therefore, only structures that related to the present disclosure are displayed.

In order to understand the relevant technical solution of the present disclosure, the application environment of the present disclosure is now described. The application scene is the inside of a reaction kettle, and the conventional method is to spray with a solenoid valve. However, the acid-base situation inside the reaction kettle is uncertain, at this time, the service life of the solenoid valve may be greatly shortened, or the solenoid valve does not work. The working and non-working states of the solenoid valve cannot be controlled. Once the non-working state occurs during the reaction, the reaction may fail, and the input production raw materials are invalid. Compared with the cost of the solenoid valve, the cost of production raw materials is far greater than that of the solenoid valve. This uncertain factor may increase the loss and rejection rate of raw materials.

Embodiment 1

Figure 2:
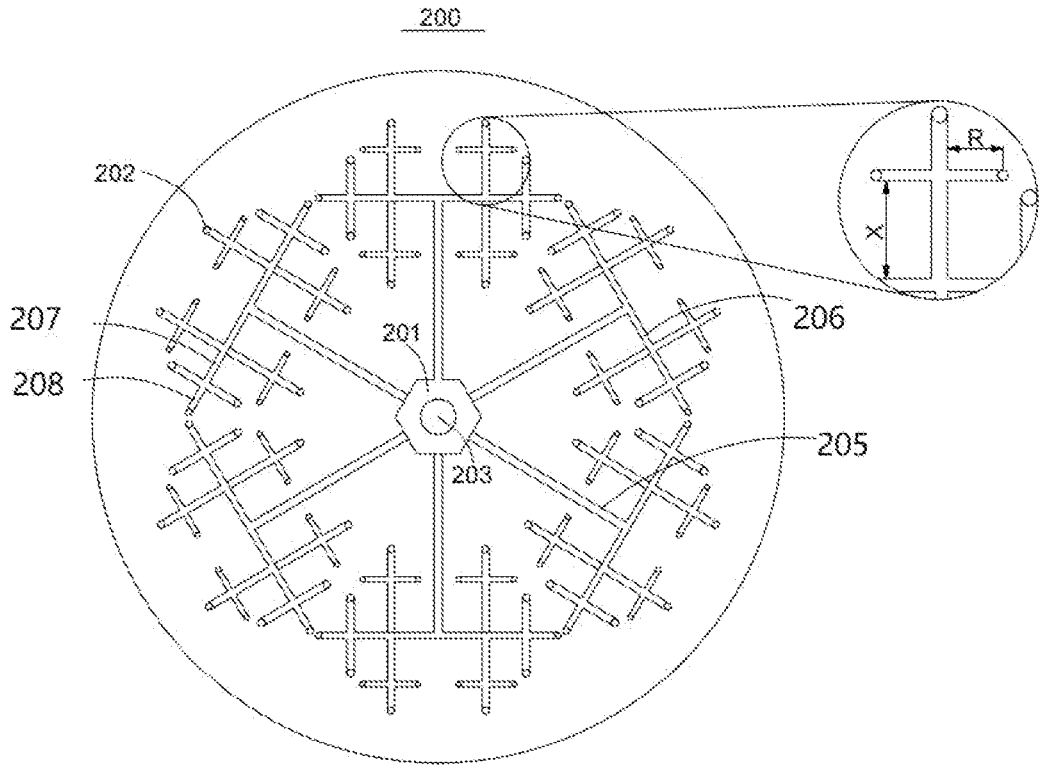
FIG. 2 is a front view of a preferred embodiment of an upper partition plate in accordance with the present disclosure.
Figure 3:
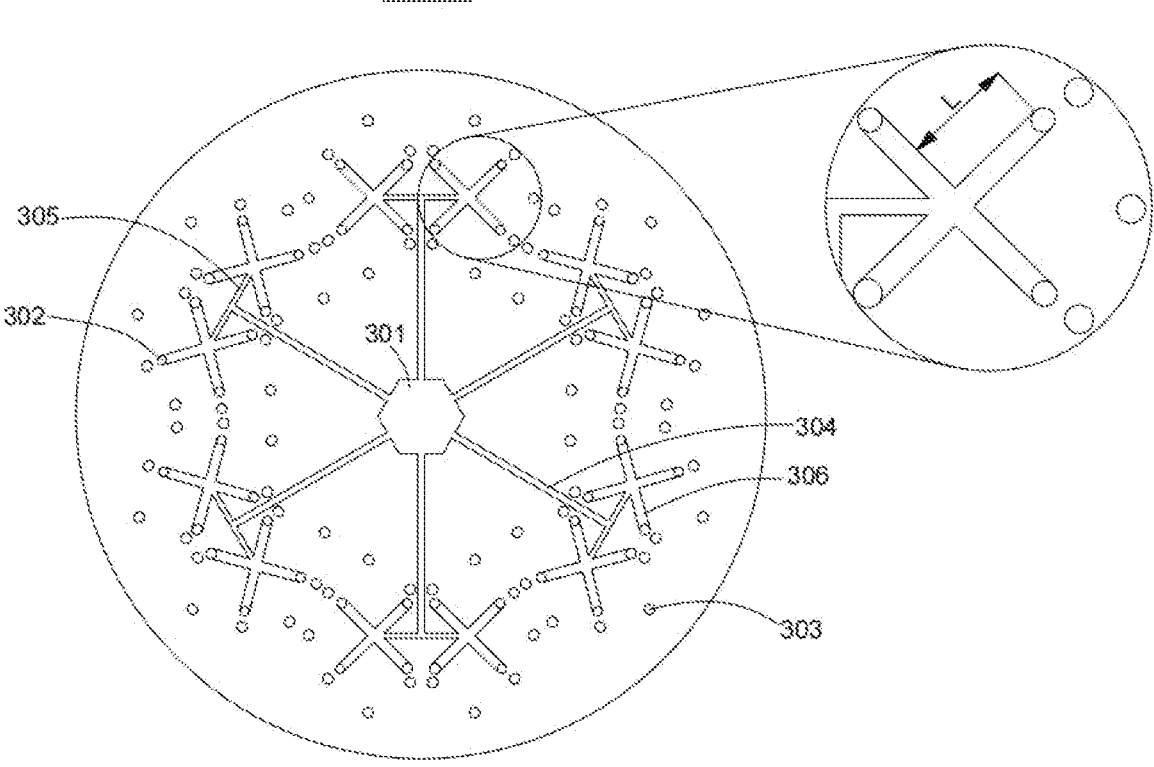
FIG. 3 is a front view of a preferred embodiment of a lower partition plate in accordance with the present disclosure.
Figure 4:
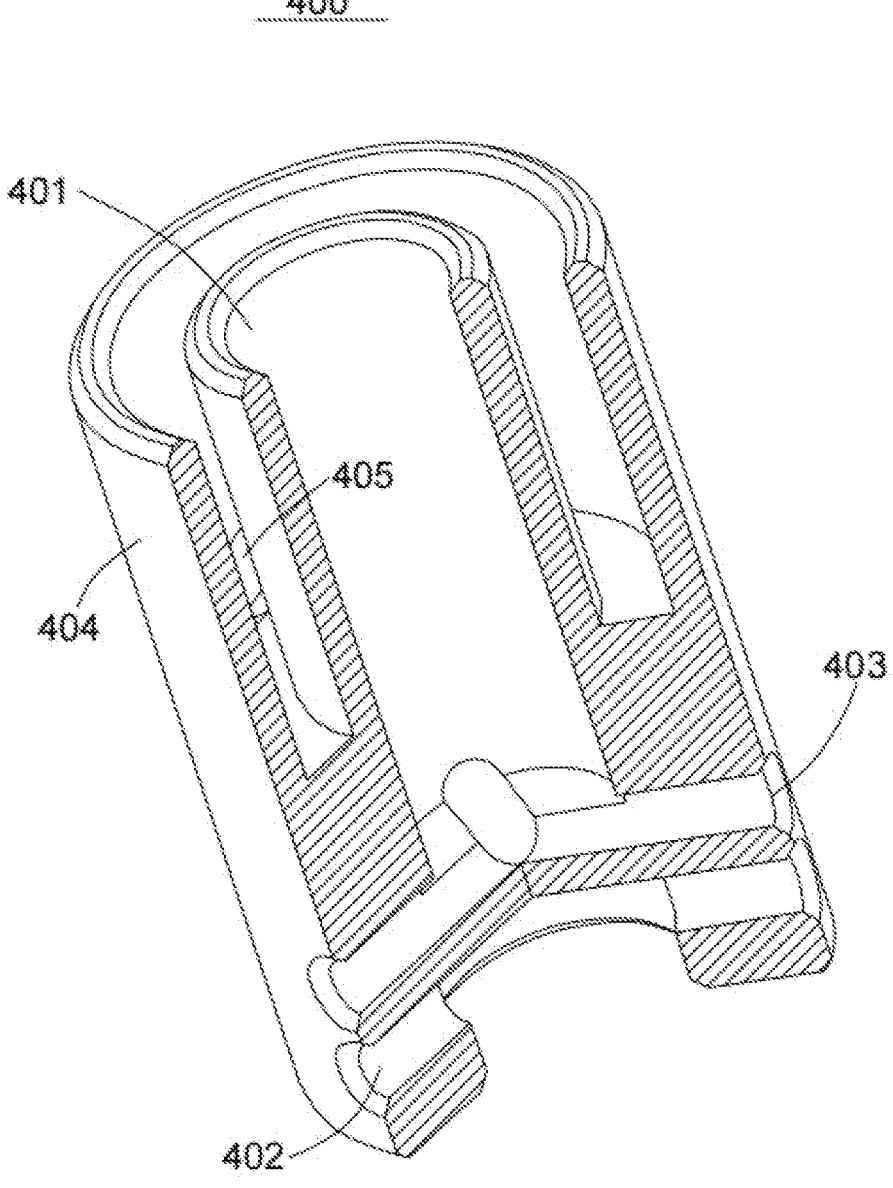
FIG. 4 is a partial sectional view of a preferred embodiment of an adjusting portion in accordance with the present disclosure.
Figure 5:
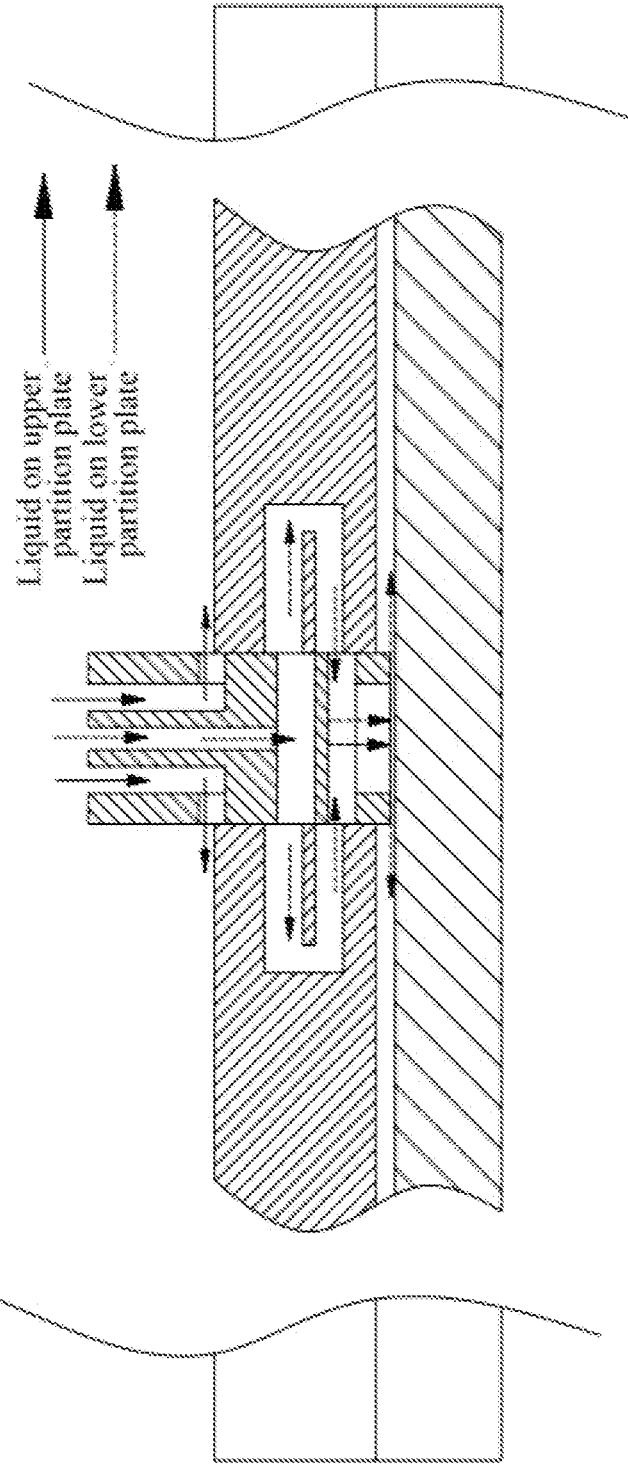
FIG. 5 is a schematic diagram of the flow of liquid on an upper partition plate and liquid on a lower partition plate in accordance with the present disclosure when the adjusting portion is in a first station.
Figure 6:
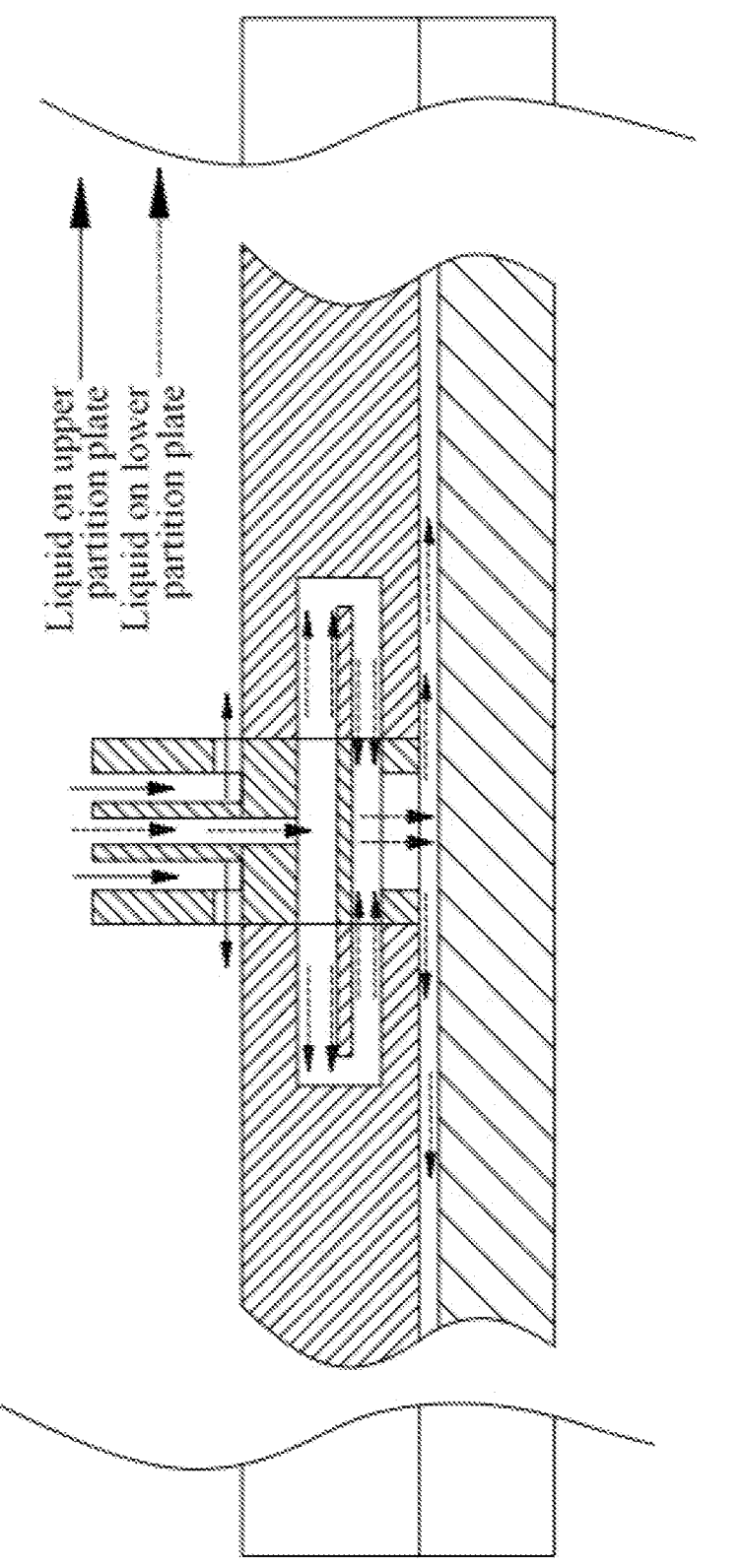
FIG. 6 is a schematic diagram of the flow of liquid on an upper partition plate and liquid on a lower partition plate in accordance with the present disclosure when the adjusting portion is in a second station.
Figure 7:
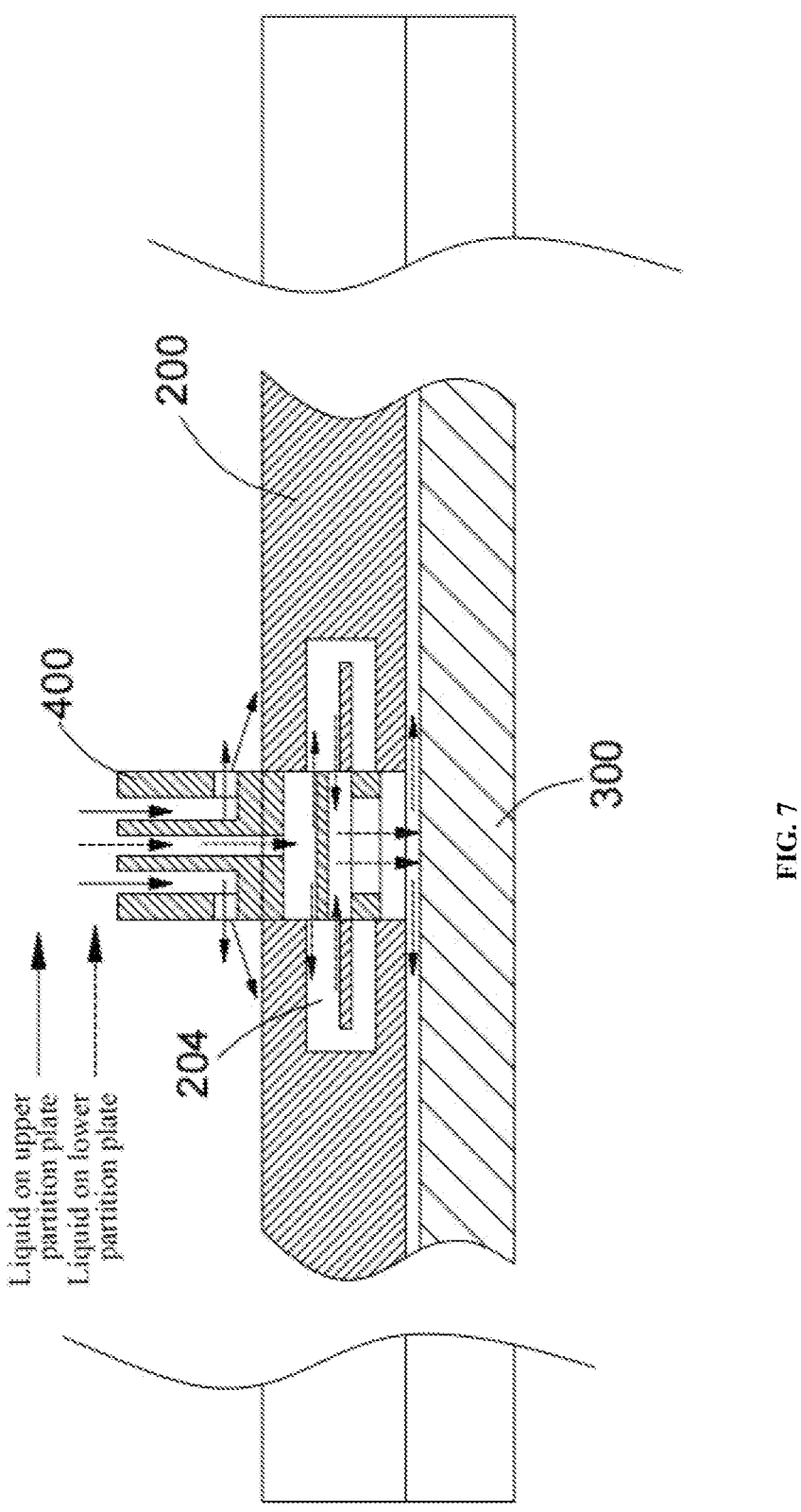
FIG. 7 is a schematic diagram of the flow of liquid on an upper partition plate and liquid on a lower partition plate in accordance with the present disclosure when in a third station.

As shown in FIG. 1 through FIG. 7, a reaction kettle is provided. The reaction kettle includes a kettle body 100, an upper partition plate 200 arranged in a chamber inside the kettle body 100, a lower partition plate 300 arranged below and attached to the upper partition plate 200, and an adjusting portion 400 provided between the upper partition plate 200 and the lower partition plate 300. The kettle body 100 is suitable for preparing composite coating solution. The upper partition plate 200 is suitable for guiding solution flowing into the upper surface of the upper partition plate 200 to spread in all directions and evenly flow into the kettle body 100. The lower partition plate 300 is suitable for guiding solution flowing into the upper surface of the lower partition plate 300 to spread in all directions and evenly flow into the kettle body 100. The adjusting portion 400 can be switched different stations, so as to adjust the order that the solution in the upper partition plate 200 and the solution in the lower partition plate 300 enter the kettle body 100, and further adjust the mixing process of the solution. The above components are described in detail below one by one.

Kettle Body

The kettle body 100 is of a cylindrical shape, the inside of which is hollow to form a chamber. Multiple support legs are provided below the kettle body 100, and thus the kettle body 100 can be fixed to a worktable through the support legs and kept vertically placed. The top of the kettle body 100 is provided with a feed port 110, and the side of the kettle body 100 is provided with a discharge port 120. Original solution for preparing a composite coating can be poured into the kettle body 100 through the feed port 110, and then enter the kettle body 100 for mixing after passing through the upper partition plate 200 and the lower partition plate 300, respectively, and the mixed coating solution can be poured out from the discharge port 120.

Upper Partition Plate

The upper partition plate 200 is disc-shaped, and can be rotatably arranged in the chamber of the kettle body 100. Specifically, the upper partition plate 200 is located at the upper part inside the chamber of the kettle body 100 and is located below the feed port 110. After the original coating solution is poured from the feed port 110, part of the original coating solution can flow through the upper end face of the upper partition plate 200, and then spread in a circumferential direction through the upper partition plate 200 to flow uniformly downward into the kettle body 100 through the upper partition plate 200. An upper jet center 201 and a number of upper flow ports 202 arranged around the upper jet center 201 are respectively provided on the upper end face of the upper partition plate 200, and the lengths of flow paths from the upper jet center 201 to the upper flow ports 202 are equal. Specifically, the upper jet center 201 is located at the center of the upper end face of the upper partition plate 200. In this embodiment, the upper jet center 201 is regular hexagon, the middle point of each edge of the upper jet center 201 is provided with a main flow channel 205 outward, and each main flow channel 205 is perpendicular to the corresponding edge of the upper jet center 201. One main flow channel 205 is divided towards two sides to form two trunk flow channels 206, and the two trunk flow channels 206 extend in opposite directions. One trunk flow channel 206 is further divided in all directions to form three secondary flow channels 207. One secondary flow channel 207 is continuously divided in all directions to form three branch flow channels 208. One upper flow port 202 is located at the tail end of the one branch flow channel 208. The main flow channel 205 and the trunk flow channel 206 are public flow channels for the original coating solution, the length of each secondary flow channel 207 is X, and the length of each branch flow channel 208 is R, thus ensuring that the lengths of paths that the original coating solution flows from the upper jet center 201 to the upper flow ports 202 are equal, i.e., the time that the original coating solution reaches the upper flow ports 202 is the same.

Lower Partition Plate

The lower partition plate 300 is disc-shaped, and has the same size as the upper partition plate 200. The lower partition plate 300 is provided below the upper partition plate 200 and is attached to the upper partition plate 200. Due to the fact that the upper end face of the lower partition plate can form an enclosed space with the lower end face of the upper partition plate 200, volatile original coating solution can be poured into the lower partition plate 300, and the concentration reduction of the original coating solution caused by volatilization in the flowing process can be avoided. When the upper partition plate 200 rotates, the lower partition plate 300 can rotate synchronously with the upper partition plate 200. After the original coating solution is poured from the feed port 110, part of the original coating solution can flow through the upper end face of the lower partition plate 300, spread in a circumferential direction through the lower partition plate 300, and then evenly and downwardly flows into the kettle body 100 after passing through the lower partition plate 300. A lower jet center 301, and a number of lower flow ports 302 and a number of through-flow ports 303 arranged around the lower jet center 301 are respectively provided on the lower partition plate 300, the lengths of flow paths from the lower Jet center 301 to the lower flow ports 302 are equal, and each upper flow port 202 communicates with one through-flow port 303. Specifically, the lower jet center 301 is located at the center of the upper end face of the lower partition plate 300. In this embodiment, the lower jet center 301 is also a regular hexagon, and the middle point of each edge of the lower jet center 301 is provided with a main gushing channel 304 outwards, and the main gushing channel 304 is perpendicular to the corresponding edge of the lower jet center 301. One main gushing channel 304 is divided toward two sides to form two trunk gushing channels 305, and the two trunk gushing channels 305 extend in opposite directions. One trunk gushing channel 305 is further divided in all directions to form four branch gushing channels 306, and one lower flow port 302 is located at the tail end of one branch gushing channel 306. The main gushing channel 304 and the trunk gushing channel 305 are public flow channels of the original coating solution, and the length of each branch gushing channel 306 is L, thus ensuring that the lengths of paths through which the original coating solution flows from the lower jet center 301 to the lower flow ports 302 are equal, i.e., the time that the original coating solution reaches the lower flow ports 302 is the same.

It should be noted that multiple lower flow ports 302 are surrounded circumferentially by multiple through-flow ports 303, and the multiple through-flow ports 303 are arranged horizontally and longitudinally. The main flow channel provided on the upper partition plate 200 coincides with a horizontal projection of the main gushing channel provided on the lower partition plate 300, and a trunk flow channel provided on the upper partition plate 200 coincides with the horizontal projection of the trunk gushing channel provided on the lower partition plate 300. However, the sum of the lengths of the secondary flow channel and branch flow channel on the upper partition plate 200 is greater than the length of the branch gushing channel on the lower partition plate 300, i.e., when the original coating solution is simultaneously introduced into the upper partition plate 200 and the lower partition plate 300 without interference, the original coating solution on the lower partition plate 300 can always enter the kettle body 100 first. In order to adjust the order that the original coating solution in the upper partition plate 200 and the original coating solution the lower partition plate 300 flow into the kettle body 100, the reaction kettle shown in this embodiment also has an adjusting portion 400.

Adjusting Portion

The adjusting portion 400 is threaded to the upper jet center 201, and is in fit with a threaded through groove 203. The original coating solution is suitable for flowing from the adjusting portion 400 to the upper jet center 201 and the lower jet center 301, and the adjusting portion 400 extends out of the feed port 110. The adjusting portion 400 can be switched to different stations to adjust the order that the solution in the upper partition plate 200 and the solution in the lower partition plate 300 enter the kettle body 100, thus adjusting the mixing process of the solution.

The structure of the adjusting portion 400 is described in detail below. The adjusting portion 400 includes a blind hole pipe 401 in which a blind hole is formed. A lower tee pipeline 402 and an upper tee pipeline 403 are upwardly provided from the bottom of the blind hole pipe 401. The center of the lower tee pipeline 402 is downwards provided with a flow pipe orifice, the center of the upper tee pipeline 403 is upwardly connected to the blind hole pipe 401. An outer ring surrounding the blind hole pipe 401 is provided with a casing wall 404, and a casing opening 405 is provided surrounding the casing wall 404. The casing opening 405 can communicate with the upper jet center 201 of the upper partition plate 200. The original coating solution poured into the blind hole pipe 401 can flow into the lower partition plate 300, the original coating solution poured between the blind hole pipe 401 and the casing wall 404 can flow to the upper jet center 201 through the casing opening 405; and the original coating solution flowing into the blind hole pipe 401 can flow into the lower jet center 301 through the upper tee pipeline 403, the lower tee pipeline 4021 and the flow pipe orifice in turn.

In order to make up for the difference between the original coating solution from the lower jet center 301 to the lower flow port 302 and the original coating solution from the upper jet center 201 to the upper flow port 202, the middle part of the upper partition plate 200 is also provided with a threaded through groove 203, which runs through the upper partition plate 200 in a thickness direction of the upper partition plate 200. An inner wall of the threaded through groove 203 has a U-shaped groove 204 with a U-shaped cross section, and the blind hole pipe 401 is threaded into the threaded through groove 203. A gap between the upper tee pipeline 403 and the lower tee pipeline 402 is in fit with a slot of the U-shaped groove 204. By rotating the casing wall 404, the relative positions between the upper tee pipeline 403 as well as the lower tee pipeline 402 and the U-shaped groove 204 can be adjusted, so as to select the critical position, and the adjusting portion 400 can be divided into three states, i.e., the upper tee pipeline 403 and the lower tee pipeline 402 are located below the U-shaped groove 204; the upper tee pipeline 403 and the lower tee pipeline 402 are flush with the U-shaped groove 204; and the upper tee pipeline 403 and the lower tee pipeline 402 are located above the U-shaped groove 204. The above three states respectively correspond to a first station, a second station and a third station of the adjusting portion 400.

In order to facilitate an operator to adjust the position of the adjusting portion 400, the end face, close to the threaded through groove 203, of the upper partition plate 200 is provided with a first label, a second label and a third label, and a side wall of the blind hole pipe 401 is provided with a first corresponding label, a second corresponding label and a third corresponding label. When the first label and the first corresponding label are adapted to each other, the blind hole pipe 401 is located at the first station; when the second label and the second corresponding label are adapted to each other, the blind hole pipe 401 is located at the second station; and when the third label and the third corresponding label are adapted to each other, the blind hole pipe 401 is located at the third station.

When the adjusting portion 400 is rotated to the first station, i.e., when the upper tee pipeline 403 and the lower tee pipeline 402 are located below the U-shaped groove 204, the upper tee pipeline 403 partially communicates with the U-shaped groove 204. At the moment, part of the original coating solution flowing into the upper tee pipeline 403 through the blind hole pipe 401 is restricted from flowing and accumulated at the lower end of the blind hole pipe 401, which makes the coating solution flowing out of the adjusting portion 400 in unit time reduced, and the time for the original coating solution to reach the lower flow port 302 increased. Thus, the liquid on the upper partition plate 200 can flow into the kettle body 100 ahead of the liquid on the lower partition plate 300.

When the adjusting portion 400 is rotated to the second station, i.e., when the upper tee pipeline 403 and the lower tee pipeline 402 are flush with the U-shaped groove 204, the upper tee pipeline 403 completely communicates with the U-shaped groove 204. At the moment, the original coating solution flowing into the upper tee pipeline 403 through the blind hole pipe 401 flows to the lower flow port 302 after the distance compensation through the U-shaped groove 204. Thus, the liquid on the upper partition plate 200 and the liquid on the lower partition plate 300 can flow into the kettle body 100 at the same time.

When the adjusting portion 400 is rotated to the third station, i.e., when the upper tee pipeline 403 and the lower tee pipeline 402 are located above the U-shaped groove 204, the upper tee pipeline 403 directly communicates with the lower tee pipeline 402 at the moment, the distance compensation function of the U-shaped groove 204 is invalid, the original solution directly flows to the lower flow port 302 through the blind hole pipe 401. Thus, the liquid on the lower partition plate 300 can flow into the kettle body 100 ahead of the liquid on the upper partition plate 200.

Embodiment 2

On the basis of Embodiment 1, it is also provided a coating preparation method using the reaction kettle according to this embodiment, in which a reaction kettle is the same as that in Embodiment 1 and will not be descried in detail again.

Specifically, a coating preparation method is as follows:

S1: An adjusting portion 400 is adjusted to a third station, and hydraulic acid is injected from the adjusting portion 400 into a kettle body 100.

S2: The adjusting portion 400 is rotated to a second station, and polyacrylic acid and ammonium sulfate are respectively injected from an upper partition plate 200 and a lower partition plate 300 and then are mixed.

S3: The adjusting portion 400 is rotated to a first station, solution containing Zn/C composite spherical particles and aniline monomers is respectively injected from the upper partition plate 200 and the lower partition plate 300, and then is mixed to form mixed solution.

S4: The mixed solution is dripped and coated on the surface of a workpiece, and then the workpiece is subjected to spin-coating to form a spin-coating solution surface.

S5: The workpiece is heated to evaporate the spin-coating solution surface, thus forming a spin-coating layer.

S6: Polyethyleneimine solution is coated on the surface of the spin-coating layer, and the workpiece is heated to evaporate the spin-coating layer, thus forming a protective coating.

S7: Step S4 to step S6 are repeated for twenty times.

The rotating speed for spin coating is from 1,300 rpm to 3,000 rpm, and the thickness of a single protective coating is from 2 μm to 3 μm.

The present disclosure has the beneficial effects that the coating preparation method using the reaction kettle is simple and fast in preparation process and good in preparation effect.

Inspired by the above ideal embodiments according to the present disclosure, through the above description, those skilled in the part can make various changes and modifications within the scope of not deviating from the technical idea of the present disclosure. The technical scope of the present disclosure is not limited to the contents in the specification, but must be determined according to the scope of the claims.

What is claimed is:

1. A reaction kettle, comprising:

a kettle body (100), wherein the top of the kettle body (100) is provided with a feed port (110), and the side of the kettle body (100) is provided with a discharge port (120);

an upper partition plate (200), wherein the upper partition plate (200) is rotatably arranged in a chamber of the kettle body (100), an upper jet center (201) and a plurality of upper flow ports (202) arranged around the upper jet center (201) are respectively provided on the upper partition plate (200), the lengths of flow paths from the upper jet center (201) to the upper flow ports (202) are equal;

a lower partition plate (300), wherein the lower partition plate (300) is attached to the upper partition plate (200), a lower jet center (301), and a plurality of lower flow ports (302) and a plurality of through-flow ports (303) arranged around the lower jet center (301) are respectively provided on the lower partition plate (300), the lengths of flow paths from the lower jet center (301) to the lower flow ports (302) are equal, and each upper flow port (202) communicates with one of the through-flow ports (303);

an adjusting portion (400), wherein the adjusting portion (400) is threaded to the upper jet center (201), liquid is able to flow from the adjusting portion (400) to the upper jet center (201) and the lower jet center (201), respectively, and the adjusting portion (400) extends out of the feed port (110); wherein when the adjusting portion (400) is rotated to a first station, the liquid on the upper partition plate (200) flows into the kettle body (100) ahead of the liquid on the lower partition plate (300);

when the adjusting portion (400) is rotated to a second station, the liquid on the upper partition plate (200) and the liquid on the lower partition plate (300) flow into the kettle body (100) at the same time; and when the adjusting portion (400) is rotated to a third station, the liquid on the lower partition plate (300) flows into the kettle body (100) ahead of the liquid on the upper partition plate (200).

2. The reaction kettle according to claim 1, wherein the plurality of lower flow ports (302) are circumferentially surrounded by the plurality of through-flow ports (303); and the plurality of through-flow ports (303) are arranged horizontally and longitudinally.

3. The reaction kettle according to claim 2, wherein the adjusting portion (400) comprises a blind hole pipe (401) with a blind hole formed inside, and a lower tee pipeline (402) and an upper tee pipeline (403) are arranged upwards from the bottom of the blind hole pipe (401); the center of the lower tee pipeline (402) is downwards provided with a flow pipe orifice, the center of the upper tee pipeline (403) is upwardly connected to the blind hole pipe (401), and an outer ring surrounding the blind hole pipe (401) is provided with a casing wall (404);

a casing opening (405) is provided surrounding the casing wall (404);

the middle part of the upper jet center (201) is provided with a threaded through groove (203), the inner wall of the threaded through groove (203) is provided with a U-shaped groove (204) having a U-shaped cross section, and the blind hole pipe (401) is threaded into the threaded through groove (203); and the casing wall (404) is rotated to adapt to the first station, the second station and the third station.

4. The reaction kettle according to claim 3, wherein a gap between the upper tee pipeline (403) and the lower tee pipeline (402) is in fit with a slot of the U-shaped groove (204).

5. The reaction kettle according to claim 4, wherein the end face, close to the threaded through groove (203), of the upper partition plate (200) is provided with a first label, a second label and a third label, and the side wall of the blind hole pipe (401) is provided a first corresponding label, a second corresponding label and a third corresponding label;

when the first label and the first corresponding label are adapted to each other, the blind hole pipe (401) is located at the first station;

when the second label and the second corresponding label are adapted to each other, the blind hole pipe (401) is located at the second station; and when the third label and the third corresponding label are adapted to each other, the blind hole pipe (401) is located at the third station.

6. A coating preparation method using the reaction kettle according to claim 1, comprising the following steps:

S1: adjusting an adjusting portion (400) to a third station, injecting hydrochloric acid into a kettle body (100) from the adjusting portion (400);

S2: adjusting the adjusting portion (400) to a second station, injecting polyacrylic acid and ammonium sulfate from an upper partition plate (200) and a lower partition plate (300), respectively, and mixing the polyacrylic acid and ammonium sulfate;

S3: adjusting the adjusting portion (400) to a first station, injecting solution containing Zn/C composite spherical particles and aniline monomers from the upper partition plate (200) and the lower partition plate (300), respectively, and mixing the solution containing Zn/C composite spherical particles and aniline monomers to form mixed solution;

S4: dripping and coating the mixed solution on the surface of a workpiece and performing spin coating to form a spin-coating solution surface;

S5: heating the workpiece, and evaporating the spin-coating solution surface to form a spin-coating layer; and S6: coating a polyethyleneimine solution on the surface of the spin-coating layer, heating the workpiece, and evaporating the spin-coating layer to form a protective coating.

7. The coating preparation method according to claim 6, wherein the plurality of lower flow ports (302) are circumferentially surrounded by the plurality of through-flow ports (303); and the plurality of through-flow ports (303) are arranged horizontally and longitudinally.

8. The coating preparation method according to claim 7, wherein the adjusting portion (400) comprises a blind hole pipe (401) with a blind hole formed inside, and a lower tee pipeline (402) and an upper tee pipeline (403) are arranged upwards from the bottom of the blind hole pipe (401); the center of the lower tee pipeline (402) is downwards provided with a flow pipe orifice, the center of the upper tee pipeline (403) is upwardly connected to the blind hole pipe (401), and an outer ring surrounding the blind hole pipe (401) is provided with a casing wall (404);

a casing opening (405) is provided surrounding the casing wall (404);

the middle part of the upper jet center (201) is provided with a threaded through groove (203), the inner wall of the threaded through groove (203) is provided with a U-shaped groove (204) having a U-shaped cross section, and the blind hole pipe (401) is threaded into the threaded through groove (203); and the casing wall (404) is rotated to adapt to the first station, the second station and the third station.

9. The coating preparation method according to claim 8, wherein a gap between the upper tee pipeline (403) and the lower tee pipeline (402) is in fit with a slot of the U-shaped groove (204).

10. The coating preparation method according to claim 9, wherein the end face, close to the threaded through groove (203), of the upper partition plate (200) is provided with a first label, a second label and a third label, and the side wall of the blind hole pipe (401) is provided a first corresponding label, a second corresponding label and a third corresponding label;

when the first label and the first corresponding label are adapted to each other, the blind hole pipe (401) is located at the first station;

when the second label and the second corresponding label are adapted to each other, the blind hole pipe (401) is located at the second station; and when the third label and the third corresponding label are adapted to each other, the blind hole pipe (401) is located at the third station.

11. The coating preparation method according to claim 6, further comprising the following steps:

S7: repeating step S4 to step S6 for twenty times.

12. The coating preparation method according to claim 7, further comprising the following steps:

S7: repeating step S4 to step S6 for twenty times.

13. The coating preparation method according to claim 8, further comprising the following steps:

S7: repeating step S4 to step S6 for twenty times.

14. The coating preparation method according to claim 9, further comprising the following steps:

S7: repeating step S4 to step S6 for twenty times.

15. The coating preparation method according to claim 10, further comprising the following steps:

S7: repeating step S4 to step S6 for twenty times.

16. The coating preparation method according to claim 6, wherein the rotating speed for spin coating is from 1,300 rpm to 3,000 rpm, and the thickness of a single protective coating is from 2 μm to 3 μm.

17. The coating preparation method according to claim 7, wherein the rotating speed for spin coating is from 1,300 rpm to 3,000 rpm, and the thickness of a single protective coating is from 2 μm to 3 μm.

18. The coating preparation method according to claim 8, wherein the rotating speed for spin coating is from 1,300 rpm to 3,000 rpm, and the thickness of a single protective coating is from 2 μm to 3 μm.

19. The coating preparation method according to claim 9, wherein the rotating speed for spin coating is from 1,300 rpm to 3,000 rpm, and the thickness of a single protective coating is from 2 μm to 3 μm.

20. The coating preparation method according to claim 10, wherein the rotating speed for spin coating is from 1,300 rpm to 3,000 rpm, and the thickness of a single protective coating is from 2 μm to 3 μm.

* * * * *